(12) United States Patent
Cabanne et al.

(10) Patent No.: US 9,927,083 B2
(45) Date of Patent: Mar. 27, 2018

(54) LIGHTING DEVICE FOR A MOTOR VEHICLE

(71) Applicant: Valeo Iluminacion, Martos (ES)

(72) Inventors: Damien Cabanne, Martos (ES); Alberto Rodriguez-Fuentes, Jaen (ES); Jose Castillo Jimenez, Martos (ES); Jose-Antonio Aguilar Del Moral, Jaen (ES)

(73) Assignee: VALEO ILUMINACION, Martos (ES)

( * ) Notice: Subject to any disclaimer, the term of this patent is extended or adjusted under 35 U.S.C. 154(b) by 216 days.

(21) Appl. No.: 14/749,961

(22) Filed: Jun. 25, 2015

(65) Prior Publication Data
US 2015/0377438 A1 Dec. 31, 2015

(30) Foreign Application Priority Data
Jun. 27, 2014 (FR) ..................... 14 56096

(51) Int. Cl.
*F21S 8/10* (2006.01)
*B60Q 1/00* (2006.01)

(52) U.S. Cl.
CPC .......... *F21S 48/1109* (2013.01); *B60Q 1/007* (2013.01); *F21S 48/1104* (2013.01); *F21S 48/1113* (2013.01); *F21S 48/13* (2013.01); *F21S 48/211* (2013.01); *F21S 48/328* (2013.01)

(58) Field of Classification Search
CPC ...... F21S 48/211; F21S 48/1104; B60Q 1/007
See application file for complete search history.

(56) References Cited

U.S. PATENT DOCUMENTS

| 6,161,951 | A | 12/2000 | Yoneyama et al. | |
| 2001/0040810 | A1* | 11/2001 | Kusagaya | B60Q 1/085 362/351 |
| 2003/0165066 | A1* | 9/2003 | Watanabe | F21S 48/1778 362/523 |
| 2004/0208017 | A1* | 10/2004 | Takiguchi | B60Q 1/10 362/524 |
| 2005/0201117 | A1* | 9/2005 | Sugimoto | F21S 48/1794 362/539 |
| 2007/0082577 | A1* | 4/2007 | Tajima | B60Q 1/076 445/66 |

(Continued)

FOREIGN PATENT DOCUMENTS

| DE | 10051626 | 5/2001 |
| DE | 10051626 A1 | 5/2001 |

(Continued)

*Primary Examiner* — Elmito Breval
(74) *Attorney, Agent, or Firm* — Oblon, McClelland, Maier & Neustadt, L.L.P.

(57) ABSTRACT

A lighting device for a motor vehicle, comprising a housing in which are arranged at least light-emitting means and optical-deflection means able to deflect the rays of light emitted toward an output face of the device, the device further comprising a main orifice formed in the housing for extracting the light-emitting means from the housing along a first axis.

Fastening means are provided for fastening the emitting means in the device and the housing comprises an additional axis, distinct from the main orifice, for accessing the fastening means.

The invention also relates to a motor vehicle headlamp equipped with at least one device of this type, and to a method of repositioning replacement means in a lighting device.

16 Claims, 3 Drawing Sheets

(56) References Cited

U.S. PATENT DOCUMENTS

| | | | | |
|---|---|---|---|---|
| 2007/0133220 | A1* | 6/2007 | Watanabe | B29C 65/08 362/538 |
| 2008/0130301 | A1* | 6/2008 | Kusagaya | B60Q 1/076 362/466 |
| 2010/0110709 | A1* | 5/2010 | Tajima | B60Q 1/076 362/509 |
| 2011/0063866 | A1* | 3/2011 | Shibata | B60Q 1/076 362/523 |
| 2012/0201039 | A1* | 8/2012 | Shibata | B60Q 1/0683 362/460 |
| 2012/0300485 | A1* | 11/2012 | Lee | B60Q 1/143 362/514 |
| 2014/0022806 | A1* | 1/2014 | Shibata | B60Q 1/076 362/508 |
| 2014/0112011 | A1* | 4/2014 | Nomura | F21S 48/1742 362/460 |
| 2014/0226355 | A1* | 8/2014 | Blandin | F21S 48/1109 362/520 |
| 2014/0226357 | A1 | 8/2014 | Brendle et al. | |

FOREIGN PATENT DOCUMENTS

| | | |
|---|---|---|
| DE | 102007040729 | 3/2009 |
| DE | 102007040729 A1 | 3/2009 |
| DE | 102011052551 | 2/2013 |
| DE | 102011052551 A1 | 2/2013 |
| DE | 102011081062 | 2/2013 |
| DE | 102011081062 A1 | 2/2013 |
| FR | 2950129 | 3/2011 |
| FR | 2950129 A1 | 3/2011 |
| GB | 2331145 | 5/1999 |
| GB | 2331145 A | 5/1999 |

\* cited by examiner

LIGHTING DEVICE FOR A MOTOR VEHICLE

CROSS-REFERENCE TO RELATED APPLICATIONS

This application claims priority to the French application 1456096 filed Jun. 27, 2014, which application is incorporated herein by reference and made a part hereof.

FIELD OF THE INVENTION

The present invention relates to the field of motor vehicle lighting and/or signaling and to the design of lighting devices comprising means of emitting rays of light directed toward the output of the device. It relates more particularly to the arrangement of such lighting devices for access to the light sources.

DESCRIPTION OF THE RELATED ART

Such devices, in which the emitting means comprise at least one light-emitting diode, which would need to be positioned at the focal point of a substantially elliptical collector so that the rays emitted are directed parallel to the optical axis toward an optical system at the output of the device are known.

Light-emitting diodes have, amongst other advantages, the advantage of a life that is greater than that which other types of light source may have. However, it will be appreciated that, for various reasons, the owner of the vehicle may need to replace the light-emitting diode in the device.

Whether as part of original equipment when assembling the lighting device or in the context of the replacement of a defective diode, the positioning of the diode needs to be very accurate, at the focal point of the collector, for the lighting and/or signaling quality of the vehicle to be optimal.

Document FR2950129 discloses an optical module comprising a collector support means. The support means comprises a space able to house an adapter on which a printed circuit board and a light-emitting diode are fixed. When the diode needs to be changed, all that is then required is for the adapter to be removed, a new diode fitted to the printed circuit board, and the adapter returned to the space housing it.

The adapter is held in place in two directions in space by the walls of the space housing it and complementary means of blocking it in position in the third direction of space are provided in order to fix the position of the adapter, which needs to be accurate so that the diode borne by the adapter is positioned accurately with respect to the first focal point of the collector, which collects the rays emitted from the diode.

Such an arrangement allows high positional accuracy in the positioning of the light source, but the clearance that needs to be left in order to access these complementary position-blocking means makes it difficult for these modules to be fitted in the confined space of a headlamp.

SUMMARY OF THE INVENTION

One problem of the present invention is to improve this type of lighting device to make the handling operations necessary for replacing the light-emitting devices when these have worn out easier.

In this context, the invention seeks to propose a lighting device for a motor vehicle, comprising a housing in which are arranged at least light-emitting means or at least one light-emitting device and optical-deflection means or an optical deflector able to deflect the rays of light emitted toward an output face of the device, the device further comprising a main orifice formed in the housing for extracting the light-emitting means from the housing along a first axis. Fastening means or a fastener are provided for fastening the emitting means in the device and the housing comprises an additional access, distinct from the main orifice, for accessing the fastening means.

According to one embodiment of the invention, the extracting of the light-emitting means from the housing can be done through this main orifice, the light-emitting means being dimensioned and arranged to fit through this main orifice.

According to various features considered alone or in combination, provision will be made for:

- the fastening means to be formed of one or more elements chosen from: a binding screw, a clamp, a clip or a quarter-turn fastener;
- the additional access to be closed by a closing wall formed as an integral part of the housing, the fastening means not being accessible until the wall has been detached from the housing, notably by severing. That makes it possible to have a housing with a limited number of accesses in production. During the course of use of the lighting device, if it proves necessary to change the light-emitting means, this closure wall can be severed, in order to allow access to the fastening means. Once opened, the housing can then be closed by an additional cap, which for example is delivered with the replacement light-emitting means;
- the additional access to face the fastening means;
- the closure wall to be formed on a face of the housing that is distinct from the face of the housing on which the main orifice is formed;
- the additional access to be formed of a bore made in the housing in such a way as to be positioned in line with the fastening means; notably, the additional access may be formed on a face of the housing distinct from the face of the housing on which the main orifice is formed;
- the bore of the additional access to extend along an axis essentially perpendicular to the first axis of the main orifice;
- the additional access to comprise a cover held on the housing by severable means and covering the bore, notably prior to first use of the severable means. This then is the configuration prior to first replacement of the light-emitting means. This cover notably corresponds to the closure wall formed as an integral part of the housing as described hereinabove, the fastening means not being accessible until after the wall has been separated for the housing, notably by severing.
- the severable means then potentially to consist of the presence of a frangible periphery able to be torn upon first use of the severable means;
- the cover to comprise means for grasping in order to clear the cover away after the severable means have been torn;
- retaining means to be provided in the bore of the additional access, the retaining means being able to collaborate with complementary means borne by a removable closure dimensioned to cover the additional access after the severable cover has been removed. The retaining means may be of bayonet type. Provision may be made for the lighting device to comprise from the outset, in place of the severable cover, a removable rubber closure, the closure and the bore allowing fastening of the bayonet fastening type;

a sleeve formed as an integral part of the housing to extend from the housing and surrounds the additional access;

the light-emitting means to be borne by an interchangeable modular element fixed in the device with respect to the reflector by the fastening means, the interchangeable modular element being sized so that it can pass through the main orifice;

the fastening means to comprise first fastening means that hold the modular element in position in the housing along the first axis, and second fastening means which press the modular element along an axis distinct from the first axis, at least one additional access being provided for accessing the second fastening means;

the main orifice to allow the passage of two interchangeable modular elements each one bearing distinct light-emitting means, and the housing to comprise two distinct additional accesses respectively associated with one of the interchangeable modular elements.

The lighting device as has been described hereinabove may be a lighting and/or signaling headlamp of the motor vehicle, notably a vehicle headlamp, also referred to as a headlight.

The invention also relates to a method for replacing light-emitting means of a motor vehicle lighting device, in which method various steps are performed in succession, these including a step of uncovering a main orifice arranged on a first face of a housing of the device by removing a cap that covers the orifice, a step of cutting severable means associated with a cover covering an additional access arranged on a second face of the housing, a step of removing fastening means arranged facing the additional access, a step of extracting the light-emitting means that are to be replaced via the main orifice, a step of repositioning replacement light-emitting means in the housing, a step of fixing the emitting means in the device by a tightening fastening means at additional accesses, a step of fitting removable closures in the additional accesses, and a step of fixing the cap to cover the main orifice. This motor vehicle lighting device is a lighting device.

BRIEF DESCRIPTION OF THE ACCOMPANYING DRAWINGS

Further features and advantages of the invention will become apparent from reading the detailed description of one embodiment which follows and for an understanding of which reference will be made to the attached figures each of which depicts one and the same lighting device viewed from different angles and at different successive steps in the replacement method according to the invention:

DETAILED DESCRIPTION OF THE PREFERRED EMBODIMENTS

Figure 1:
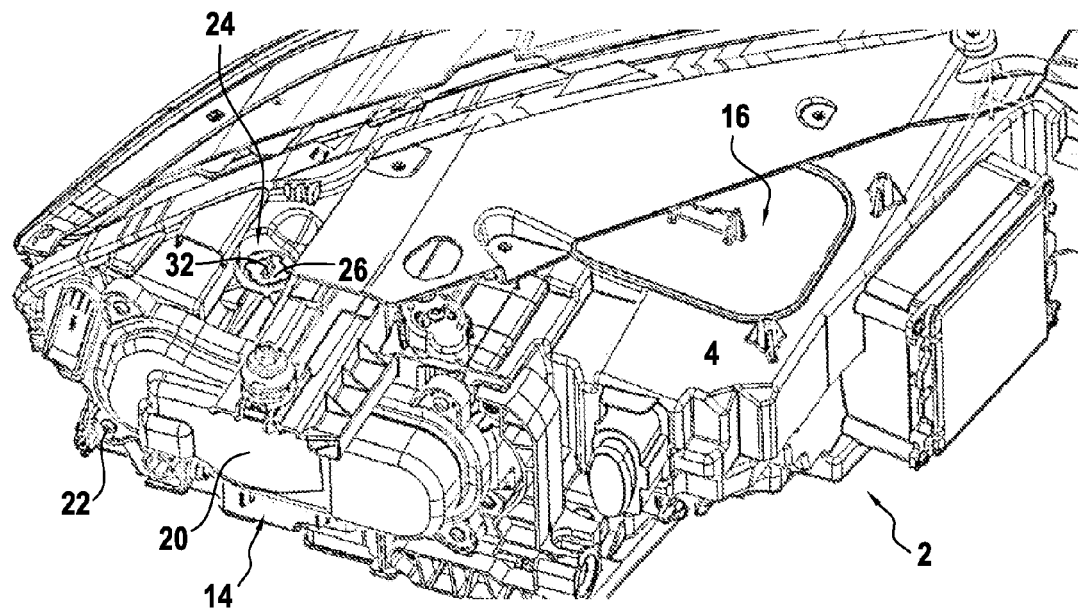
FIG. 1 is a three quarters rear perspective view of a housing of a lighting device, at an initial step in the replacement method in which step a cap is fitted over a rear face of the housing of the device to cover a main orifice and at least one severable cover is mounted on an upper face of the housing to cover an additional access.
Figure 2:
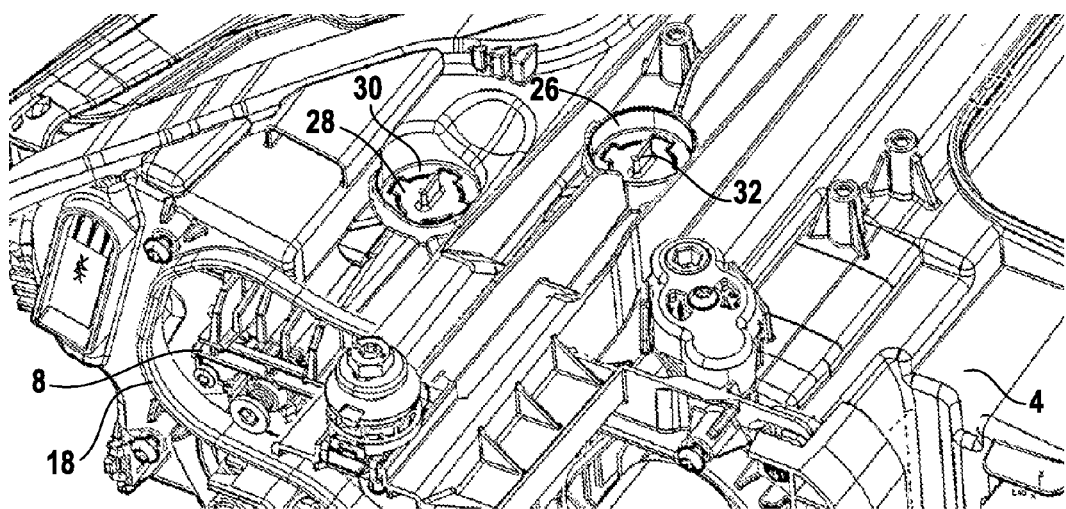
FIG. 2 is a detail view of FIG. 1, zooming in on the rear face of the housing of the device, at a second step in the replacement method, in which step the cover has been removed.
Figure 3:
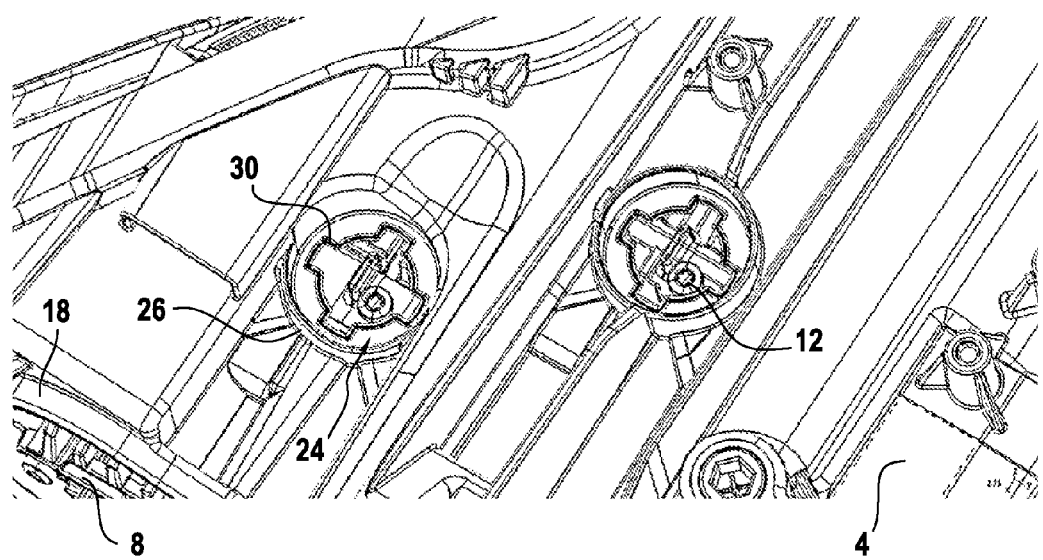
FIG. 3 is a detail view of FIG. 1, zooming in on the upper face of the housing of the device, at a third step in the replacement method, in which step the severable cover has been removed in order to gain access to second fastening means for fixing the light-emitting means in the housing of the device.
Figure 4:
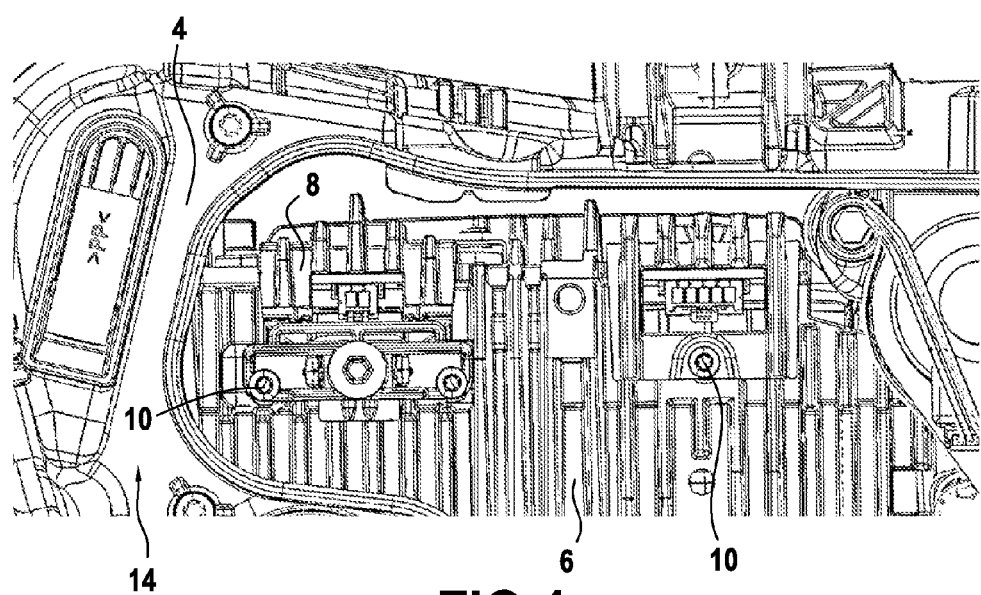
FIG. 4 is a view of the rear face of the housing of the device, in a fourth step of the replacement method in which step the first fastening means that fix the light-emitting means in the housing of the device are removed.
Figure 5:
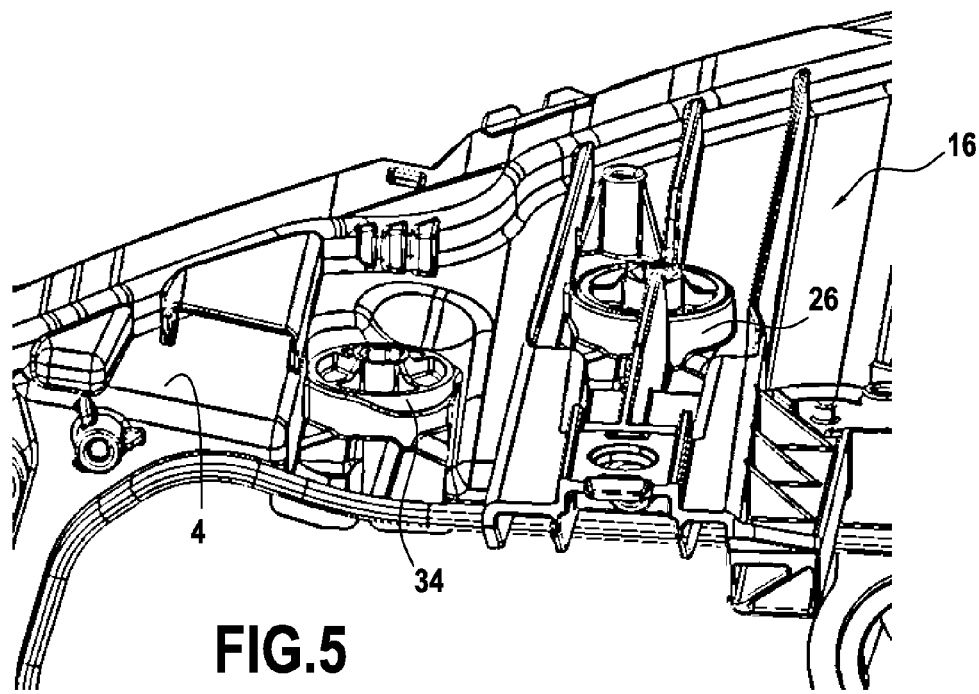
FIG. 5 is a three quarters rear perspective view depicting only the housing, for greater clarity, in a fifth step of the replacement method in which step removable closures have been placed in the additional accesses formed on the upper face of the housing.
Figure 6:
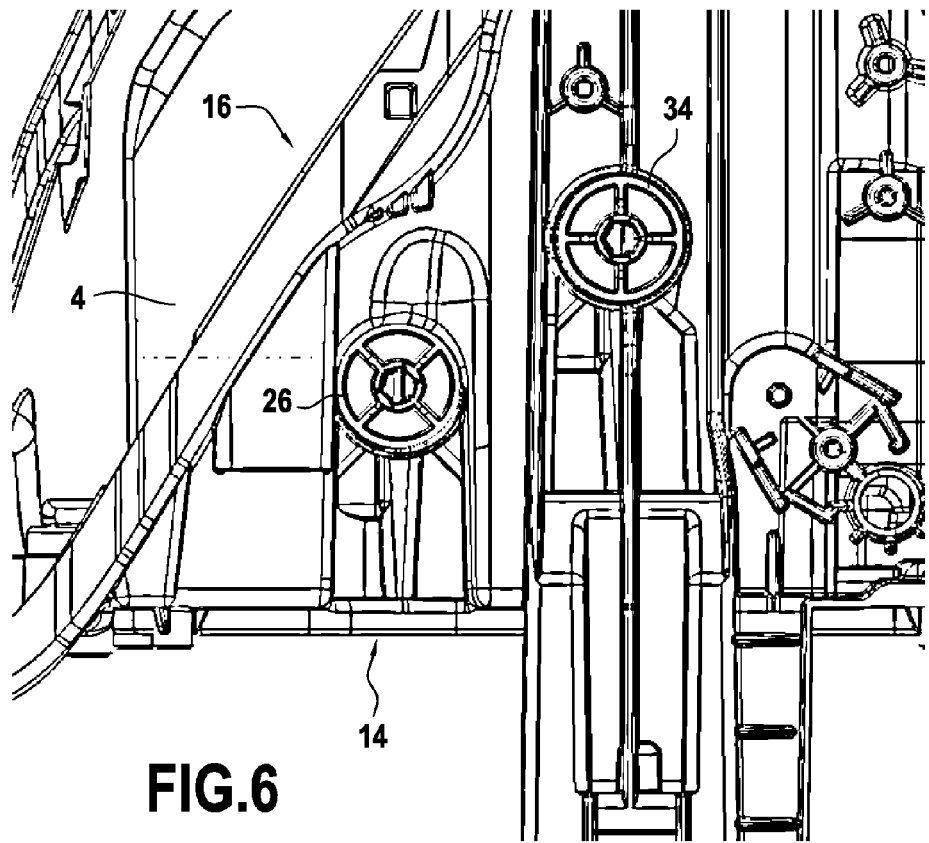
FIG. 6 is a view of the housing of FIG. 5, from above.

In what follows, the direction in which the motor vehicle travels will be termed the longitudinal direction L and the direction that is horizontal and perpendicular to this longitudinal direction will be noted the transverse direction T. The vertical direction V will be the direction perpendicular to the previous two directions which incidentally define a horizontal plane. The L, V, T trihedron has been added to the figures to make them easier to understand. However, it will be understood that the lighting device can be arranged with a different orientation without departing from the context of the invention.

As illustrated in the figures, a lighting device 2 comprises a housing 4 in which light-emitting means are able to emit rays of light toward optical-deflection means likewise housed in the housing 4.

The optical-deflection means have a reflective surface that is substantially elliptical such that it has two focal points and is able to deflect rays emitted by light-emitting means positioned at the first focal point toward an optical system positioned at the corresponding second focal point.

The optical-deflection means are borne by a support means 6 which also acts as heat exchange means. It will be appreciated that the invention seeks to protect means provided on the housing 4 to make handling the light-emitting means easier and that, in this context, figures in which the optical-deflection means are not visible have been chosen to illustrate the description.

The light-emitting means comprise a light-emitting diode and a printed circuit board. Both comprise, in the example illustrated, an adapter formed by an interchangeable modular element 8 that can be held in a space formed in the support means 6 so that the modular element 8 is correctly positioned for the associated diode to be arranged at the first focal point of the optical-deflection means.

That space is substantially cup-shaped with a bottom wall extending above the optical-deflection surface. This bottom wall is holed and that face of the modular element 8 that bears the diode faces toward the bottom wall when the modular element 8 is in place in that space that houses it. The light-emitting diode can thus emit rays through this bottom wall toward the optical-deflection means. That housing space comprises three upstanding walls that meet the bottom wall at right angles, of these two being lateral walls that extend longitudinally and one being a front wall extending transversely so that the housing space is open on the opposite face to the bottom wall, and on one of the sides, the side opposite the front wall of the housing space, to the rear of the device.

The modular element 8 is inserted via the open side of the housing space at the rear. During this insertion, the modular element 8 is blocked transversely by the lateral walls of the housing space until it comes into abutment against the front wall of the housing space.

According to the invention provision is made for the interchangeable modular element 8 to be fixed in the lighting device 2 by securing it to the support means 6 using various fastening means, in this instance formed of screws. First fastening means 10 hold the modular element 8 in position in the direction of insertion and extraction of the light-emitting means into and from the housing 4, while second fastening means 12 press the modular element 8 against the bottom wall of the space housing it.

The first fastening means 10 comprise at least one screw which extends axially in the direction of insertion and of extraction of the light-emitting means, while the second fastening means 12 comprise at least one screw extending along an axis substantially perpendicular to the direction of insertion and of extraction of the light-emitting means.

The housing 4 has a front face that forms the output face of the lighting device 2 via which face the rays of light exit, an opposite rear face 14, two lateral faces, an upper face 16 and a lower face and the housing 4 comprises at least two distinct zones for accessing the interchangeable modular element 8.

A first access zone consists in a main orifice 18 arranged on the rear face 14, via which orifice the modular element 8 can be inserted and removed along the first axis corresponding to the overall direction of extraction. The main orifice 18 is formed from the outset on the housing 4 and is covered by a rigid cap 20 as soon as all of the components of the lighting device 2 have been inserted into the housing 4. The rigid cap 20 is conventionally secured to the housing 4 by binding screws 22 engaged in tapped bores formed in the thickness of the housing around the main orifice.

A second access zone consists of an additional access 24, arranged on another face of the housing 4, advantageously the upper face 16.

The additional access 24 takes the form of a bore which extends along an axis perpendicular to the first axis of the main orifice 18 and therefore to the overall direction of extraction. The bore of the additional access 24 is arranged in line with the screw that forms the second fastening means 12 for fixing the modular element 8 to the housing 4.

As illustrated in the figures, the additional access 24 comprises a sleeve 26 formed as an integral part of the housing 4 and projecting from the upper face 16 of the housing 4. Inside this sleeve 26, the housing 4 forms a severable cover 28 which covers the bore prior to first use.

The cover 28 is severable insofar as it is held on the upper face 16 of the housing 4 by a frangible band 30 that the user can cut with a cutting tool in order to detach the cover 28 from the housing 4. The cover 28 further comprises means 32 for holding on to the cover 28 and preventing it from dropping into the housing 4 when the frangible band 30 is cut.

The additional access 24 is thus covered prior to first use by a severable cover 28, formed as an integral part of the upper face 16 of the housing 4 and, as will be explained in greater detail hereinafter, can be covered over after first use using a removable closure 34.

In the example illustrated, the removable closure 34 is a block of rubber that can be inserted into the bore and that on its upper face has a means for grasping to allow it to be removed from the bore if necessary.

It will be appreciated without departing from the scope of the invention that provision may be made for the removable closure 34 to be mounted directly in the bore of the additional access 24 prior to first use, the removable closure 34 then acting as a severable cover. The closure 34 and the bore may allow fastening of the bayonet fastening type.

Retaining means 36 are provided near the additional access 24 to collaborate with complementary means borne by the removable closure 34. In the embodiment illustrated, the retaining means 36 are of bayonet type, formed of four axial slots made in the thickness of the upper face 16 of the housing 4, in diametrically opposed pairs, on the periphery of the bore of the additional access 24. It will be seen that the frangible band 30 in this case follows the contour of the slots so that at the outset the severable cover 28 covers the entirety of the additional access bore. It will be appreciated that the retaining means 36 could differ and for example take the form of an external screw thread on the end of the cylindrical wall of the sleeve 26.

In the embodiment illustrated in the figures, the lighting device 2 comprises two additional modular elements 8 able each to be arranged in a space formed in the optical deflection means support means. Each modular element 8 bears a distinct diode and one modular element 8 may be replaced while the other modular element 8 remains in place. Two additional accesses 24 are then provided, each respectively being associated with one of the interchangeable modular elements 8, each of these accesses 24 being arranged along an axis perpendicular to the direction of extraction and of insertion of the light-emitting means. It will be appreciated that while the two additional accesses 24 may be formed on one and the same face of the housing 4, it is possible without departing from the context of the invention to provide additional accesses which are formed on different faces provided that the condition whereby the additional accesses 24 are distinct from the main orifice 18 is respected. Once again, provision is advantageously made for the additional accesses 24 to be arranged on the upper face 16 of the housing 4 so that access to the binding screws is fed vertically, the effect of this being to make screwing operations easier.

In the present description, the rear face 14 extends vertically and the direction of extraction and of insertion of the light-emitting means is substantially longitudinal according to the L, V, T trihedron used, whereas the axis along which the additional accesses 24 extend is substantially vertical. It will be appreciated that the orientations chosen here can be modified without departing from the context of the invention provided that the overall arrangement of the lighting device 2 complies with what has been described with the axes of orientation of the additional accesses 24 distinct from, possibly perpendicular to, the axis of orientation of the main orifice 18.

The method for replacing a defective diode in the lighting device 2 as described previously will now be described in greater detail, the diode being borne by the interchangeable modular element 8.

First of all, the rigid cap 20 covering the main orifice 18 is removed by unscrewing the fastening screws in order to gain access, via the rear face 14 of the housing 4, to the interchangeable modular element 8 that is to be removed, namely the one bearing the defective diode.

The severable cover 28 arranged on the upper face 16 of the housing 4 at the exit of the additional access 24 that corresponds to the interchangeable modular element 8 that is to be removed is then cut. To do this, use is for example made of a cutter to cut the frangible zones 30 and the additional access 24 is uncovered by pulling the cover 28 using its means 32 of grasping. It may be conceivable for there to be no need to cut the frangible zones 30 using a cutter and for these to be dimensioned to yield as soon as an operator pulls on them using the means of grasping of the cover 28.

Access is thus gained to the second fastening means 12 which hold the interchangeable modular element 8 to the housing 4 of the lighting device 2, and that can then be disengaged from the housing 4 in a subsequent step. Here, these second fastening means 12 are unscrewed and removed in the direction in which the additional accesses 24 extend.

The interchangeable modular element 8 and the associated light-emitting means can then be removed through the main orifice 18 in the overall direction of extraction and of insertion as introduced earlier, after having unscrewed the first fastening means 10 that held the interchangeable modular element 8 to the support means 6.

The defective light-emitting means are then replaced either by completely changing the modular element 8 or by replacing only the diode formed by this modular element 8, and the interchangeable modular element 8 is repositioned in the corresponding space that houses it formed in the support means 6 housed in the housing 4.

The interchangeable modular element 8 then needs to be blocked in position with respect to the lighting device 2 and in order to do so the screw in means are passed through the additional accesses 24 in order to screw the second fastening means 12 to the support means 6.

To seal the lighting device 2, once the second fastening means 12 are in place and correctly tightened, a removable closure 34 is fitted into the additional access 24 from which the severable cover 28 was previously removed in an earlier step. The closure 34 is blocked in position in the sleeve 26 delimiting the additional access 24, notably by a quarter turn by virtue of which the bayonet-type retaining means 36, borne in complementary manner by the housing 4 at the additional access 24 and by the cover 28, achieve the blocking effect.

The cap 20 is finally fitted back over the main orifice 18, and screwed on.

The foregoing description explains clearly how the invention is able to achieve its stated objectives and notably that of offering a lighting device 2 that allows quick and precise replacement of the light-emitting means it comprises. These objectives are notably achieved by the creation of two distinct zones for accessing these light-emitting means, these including one access zone, the main orifice 18, used for removing the light-emitting means while the other access zone, the additional access 24, is used for removing the fastening means 10 that secure these light-emitting means.

It is thus possible to have a lighting device 2 in which fastening means 10 that secure the light-emitting means are arranged on distinct faces of the housing 4 of the lighting device 2, allowing the light-emitting means to be secured better in all three dimensions of space without there being a corresponding need to provide an excessively bulky housing to allow these fastening means 10 to be tightened.

Of course, the person skilled in the art will be able to make various modifications to the lighting device 2 structures that have just been described by way of nonlimiting examples. By way of example, in an alternative form of embodiment that has not been depicted, provision may be made for the fastening means 10, and notably the second fastening means 12, not to be binding screws.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting device for a motor vehicle, comprising a housing in which are arranged at least light-emitting means and optical-deflection means able to deflect rays of light emitted toward an output face of said lighting device, said lighting device further comprising a main orifice formed in said housing for extracting said light-emitting means from said housing along a first axis, wherein fastening means are provided for fastening said light-emitting means in said lighting device and in that said housing comprises an additional access, distinct from said main orifice, for accessing said fastening means;

wherein said additional access is closed by a cover formed as an integral part of said housing, said fastening means not being accessible until said cover has been detached from said housing, said cover is detached by severing;

wherein retaining means are provided in a bore of said additional access, said retaining means being able to collaborate with complementary means borne by a removable closure dimensioned to cover said additional access after said cover has been removed.

2. The lighting device according to claim 1, wherein said fastening means are formed of one or more elements chosen from: a binding screw, a clamp, a clip or a quarter-turn fastener.

3. The lighting device according to claim 1, wherein said additional access faces said fastening means.

4. The lighting device according to claim 1, wherein said cover is formed on an upper face of said housing that is distinct from a rear face of said housing on which said main orifice is formed.

5. The lighting device according to claim 1, wherein said additional access is formed of a bore made in said housing in such a way as to be positioned in line with said fastening means.

6. The lighting device according to claim 5, wherein said additional access comprises said cover held on said housing by severable means and covering said bore.

7. The lighting device according to claim 6, wherein said severable means consist of the presence of a frangible periphery that can be torn on first use of said severable means.

8. The lighting device according to claim 7, wherein said cover comprises means for grasping in order to clear said cover away after said severable means have been torn.

9. The lighting device according to claim 1, wherein said retaining means are of bayonet type.

10. The lighting device according to claim 1, wherein said additional access comprises said cover formed by a removable closure, notably made of rubber.

11. The lighting device according to claim 10, wherein said removable closure and said bore of said additional access bear fastening means of the bayonet fastening type.

12. The lighting device according to claim 1, wherein a sleeve formed as an integral part of said housing projects from said housing and surrounds said additional access.

13. The lighting device according to claim 1, wherein said light-emitting means are borne by an interchangeable modular element fixed in said lighting device with respect to a reflector by said fastening means, said interchangeable modular element being sized so that it can pass through said main orifice.

14. The lighting device according to claim 13, wherein said fastening means comprise first fastening means that hold said interchangeable modular element in position in said housing along a first axis, and second fastening means which press said interchangeable modular element along an axis distinct from said first axis, at least one of said additional access being provided for accessing said second fastening means.

15. The lighting device according to claim 1, said lighting device being a motor vehicle headlamp.

16. A lighting device for a motor vehicle, comprising a housing in which are arranged at least one light-emitting device and at least one optical-deflector able to deflect rays of light emitted toward an output face of said lighting device, said lighting device further comprising a main orifice formed in said housing for extracting said at least one light-emitting device from said housing along a first axis, wherein a fastener is provided for fastening at least one light-emitting device in said lighting device and in that said housing comprises an additional access, distinct from said main orifice, for accessing said fastener.

\* \* \* \* \*